United States Patent [19]

Broxterman et al.

[11] 4,250,214
[45] Feb. 10, 1981

[54] WOOD-POLYMER COMPOSITE CONTAINING A DICYCLOPENTENYL ACRYLATE OR METHACRYLATE POLYMER

[75] Inventors: William E. Broxterman; Frederick L. Brown, both of Midland, Mich.

[73] Assignee: The Dow Chemical Company, Midland, Mich.

[21] Appl. No.: 660,552

[22] Filed: Feb. 23, 1976

[51] Int. Cl.² .................. B32B 23/08; B32B 27/10
[52] U.S. Cl. ............................ 428/514; 428/537; 428/541
[58] Field of Search ............ 427/393; 428/514, 537, 428/541

[56] References Cited

U.S. PATENT DOCUMENTS 3,627,659   12/1971   Marx et al. .................. 204/159.22

Primary Examiner—Bernard D. Pianalto

[57] ABSTRACT

A wood-polymer composite is prepared by impregnating a wood substrate with a liquid dicyclopentenyl acrylate or methacrylate monomer of the formula

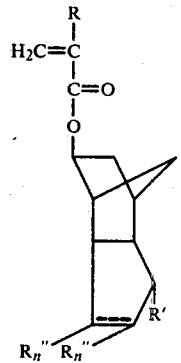

wherein R is hydrogen or methyl, R' and each R" are independently hydrogen, chloride or bromide, n is 0 or 1, and the dashed line is an optional chemical bond with the provisoes that when the dashed line is present, n is 0, and when the dashed line is absent, n is 1, and curing the resulting monomer-impregnated wood substrate by either heating same in the presence of a catalytic amount of a thermal initiator, such as a peroxide, or by exposing same to high-energy radiation, such as γ-rays. The wood-polymer composite is relatively hard and shows good resistance to hydrocarbon attack.

3 Claims, No Drawings

WOOD-POLYMER COMPOSITE CONTAINING A DICYCLOPENTENYL ACRYLATE OR METHACRYLATE POLYMER

BACKGROUND OF THE INVENTION

1. Field of the Invention:

This invention relates to wood-polymer composites. In one aspect, this invention relates to wood-polymer composites comprising a wood substrate impregnated with a dicyclopentenyl acrylate or methacrylate polymer. In another aspect, this invention relates to processes for preparing said wood-polymer composites comprising impregnating a wood substrate with a liquid dicyclopentenyl acrylate or methacrylate monomer and curing the resulting monomer-impregnated wood substrate.

2. Description of the Prior Art:

Various wood-polymer composites are known in the art. For example, U.S. Pat. Nos. 3,560,255 and 3,790,401, both by Maine, teach a wood-polymer composite consisting essentially of wood impregnated with a thermoplastic polymer of tert-butylstyrene. Whereas tert-butylstyrene monomer is amenable to heat-catalyst cure, i.e. a heat cure in the presence of a thermal initiator, it is not compatible with a high-energy radiation cure, such as γ-rays. Moreover, tert-butylstyrene polymer is relatively soft and readily attacked by hydrocarbons.

U.S. Pat. Nos. 3,077,417–20 by Kenaga teach a wood-polymer composite comprising a wood substrate impregnated with a polymer derived from a vinyl monomer, such as methyl methacrylate. A γ-radiation cure is used because the volatility of methyl methacrylate precludes both the efficient production of thin-section products, such as veneer, and the use of a heat-catalyst cure. Moreover, the monomer-impregnated wood substrate shrinks on cure which can thereby cause warping or internal checking in heavy members.

U.S. Pat. No. 3,627,659 by Marx et al. teaches a process for the production of coatings, impregnations or bonding agents by polymerization and cross-linking of mixtures containing olefinically unsaturated esters containing halogen by means of ionizing radiation. Therein, a mixture (by weight) of 80 parts 3a,4,5,6,7,7a-hexahydro-4,7-methanoindenyl acrylate-(5) (i.e. dicyclopentenyl acrylate), 10 parts 2,3-dichloro-3-bromoacrylicacid-(1) and 10 parts 2-chloroallyl acrylate is drawn into a film onto a plywood board and irradiated with an electron beam. Marx et al. do not teach impregnating with said mixture and the presence of the halogen-containing, olefinically unsaturated ester is critical to the teaching.

SUMMARY OF THE INVENTION

A novel wood-polymer composite is here disclosed comprising a wood substrate impregnated with a dicyclopentenyl acrylate or methacrylate polymer having as a component

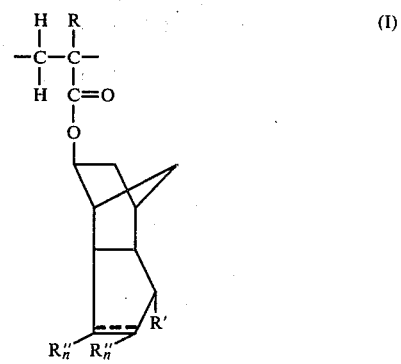

wherein R is hydrogen or methyl, R' and each R" are independently hydrogen, chloride or bromide, n is 0 or 1, and the dashed line is an optional chemical bond with the provisoes that when the dashed line is present, n is 0, and when the dashed line is absent, n is 1. Due to the low volatility and high reactivity of the corresponding dicyclopentenyl acrylate and methacrylate monomers, a monomer-impregnated wood substrate can be cured by either heating same in the presence of a catalytic amount of a thermal initiator or by exposing same to high-energy radiation. Said volatility and reactivity characteristics also provide faster cure rates and less monomer loss from the wood substrate surface during cure (as compared to tert-butylstyrene or methyl methacrylate), which are critical factors in the efficiency of preparing irregular-shaped surfaces or thin-section laminates. Moreover, the composites of this invention demonstrate minor shrinkage after polymerization of the monomers (i.e. cure), are relatively hard (thereby providing improved sanding/polishing characteristics necessary for the in-depth finish of wood-polymer composites) and show good resistance to hydrocarbon attack.

DETAILED DESCRIPTION OF THE INVENTION

The dicyclopentenyl acrylate and methacrylate monomers here used are of the formula

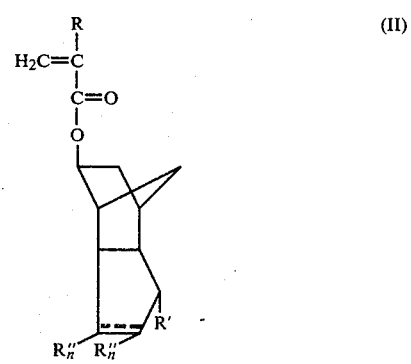

wherein R is hydrogen or methyl, R' and each R" are independently hydrogen, chloride or bromide, n is 0 or 1, and the dashed line is an optional chemical bond with the provisoes that when the dashed line is present, n is 0, and when the dashed line is absent, n is 1. These monomers are known in the art and are conveniently prepared by hydrolyzing dicyclopentadiene to dicyclopentenyl alcohol, and then either esterifying the alcohol with acrylic or methacrylic acid or transesterifying same with an alkyl acrylate or methacrylate. If an enumerated derivative is desired, i.e. R' and each R" are hydrogen, chloride or bromide, the dicyclopentenyl alcohol is hydrogenated, chlorinated or brominated prior to esterifying or transesterifying same. The dashed line, of course, is a pictorial representation of the optional olefinic unsaturation that can exist between the two $R_n''$-bearing carbon atoms (the $C_2$-$C_3$ ring atoms according to Chemical Abstracts nomenclature). When the dashed line is absent, the monomer ring system is saturated; when the dashed line is present, the monomer ring system is olefinically unsaturated. Monomers wherein R' is hydrogen are preferred. Monomers wherein R' and each R" are hydrogen are more preferred. For economic reasons, most preferred are monomers wherein R' is hydrogen and the ring system is olefinically unsaturated, i.e. dicyclopentenyl acrylate and methacrylate (i.e. 3a,4,5,6,7,7a-hexahydro-4,7-methanoindenyl acrylate-(5) and methacrylate-(5)).

The term "wood substrate" as used herein is intended to encompass wood, wood composites and wood-derived products. Any wood substrate capable of impregnation by an above-enumerated monomer can be used in the practice of this invention. Typical examples include: wood, such as southern and ponderosa pine (softwood species) and maple and oak (hardwood species); wood composites, such as particle and fiber board and reconstituted products; and wood-derived products, such as veneer and paper.

The wood-polymer composite of this invention can be prepared by any suitable impregnating process. The basic process of impregnation, which is well known in the art, generally involves the steps of impregnating the wood substrate with a liquid monomer and curing the resulting monomer-impregnated wood substrate either through the use of heat or high-energy radiation. For example, one common method of impregnating a wood substrate with an impregnating liquid monomer involves the steps of evacuating the impregnating atmosphere, impregnating, and then returning the impregnating atmosphere (or applying super-atmospheric pressure).

By "impregnating" is meant the filling of the voids beneath the surface of the wood substrate with a polymerizable material (a formula II monomer plus modifiers, if any). Of course, certain characteristics of the resulting wood-polymer composite, such as sanding and polishing, chemical resistance, etc., can be varied by controlling the amount and depth of monomer impregnation into the wood substrate.

If the wood-polymer composite is to be prepared by a radiation cure process, high-energy radiation is generally employed. Illustrative radiation include $\gamma$-rays obtained from isotopes, such as cobalt 60, and $\beta$-rays obtained from an electron-beam accelerator.

The polymerizable material typically includes a catalytic amount of thermal initiator (which can include a promoter, such as N,N-dimethyl aniline or cobaltous naphthenate) if the wood-polymer composite is to be prepared by a heat cure process. Suitable thermal initiators are soluble in either a neat formula II monomer or in the solvent in which the formula II monomer itself is dissolved. Illustrative thermal initiators include azo compounds, such as azobisisobutyronitrile, and peroxides, such as benzoyl peroxide. If a thermal initiator is present, it is generally in the amount of from about 0.2 to about 2 percent by weight of the polymerizable material. However, the precise amount necessary to initiate polymerization can only be quantified for given conditions, i.e. cure time, thermal energy, wood substrate, presence of a promoter, etc.

Other typical modifiers include fillers, resins, solvents, cross-linking agents, and other such material that is either capable of being incorporated into the wood voids or aids in the impregnating process. The use or nonuse of such material is determined by the needs of the individual practitioner.

The polymerizable material can also include other olefinically unsaturated monomers, such as alkyl acrylates and methacrylates; acrylamide, methacrylamide and their derivatives; styrene and its derivatives; acrylonitrile and the like. These other monomers are characterized by both their ability to impregnate the wood substrate and their ability to react with the formula II monomers to form copolymers within said voids. The formula II monomers comprise generally about 50 weight percent of the resulting copolymer and preferably about 85 weight percent.

The following examples are illustrative of certain specific embodiments of the invention. However, these examples are for illustrative purposes only and should not be construed as limitations upon the invention. Unless otherwise noted, all parts and percentages are by weight.

SPECIFIC EMBODIMENTS

Various wood-polymer composites were prepared and evaluated to demonstrate certain characteristics of this invention. End-grain wafers of ponderosa pine sapwood (2 inches tangentially, 1⅜ inches radially, and 3/16 inches longitudinally) were used because this type of specimen maximizes ingress and egress of chemical and/or water treatments and optimizes determination of shrinkage and/or swelling.

Each wafer was treated with one of three impregnating solutions. The first solution contained 3a,4,5,6,7,7a-hexahydro-4,7-methanoindenyl acrylate-(5) (i.e. dicyclopentenyl acrylate, DCPDA) as the impregnating monomer. The second solution contained tert-butylstyrene (t-BS) as the impregnating monomer. The third solution was void of any impregnating monomer. Each impregnating solution contained 5 percent of diethylene glycol diacrylate and 0.25 percent VAZO ® catalyst (azobisisobutyronitrile manufactured by E. I. duPont de Nemours & Co.), both based on total solution.

The impregnating solutions were either solvent-based or neat. The former impregnating solutions contained, as the solvent, either methylene chloride ($CH_2Cl_2$) or a ternary system comprising 65 percent ethanol (95 percent), 32 percent acetone and 8 percent isopropyl alcohol. The solvent-based impregnating solutions also contained either 10, 25 or 50 percent dicyclopentenyl acrylate or 25 percent tert-butyl styrene.

A vacuum-atmospheric pressure impregnating process was used. The wafers were held under a 25–29 inch vacuum for 30 minutes, then exposed to one of the treating solutions while maintaining the vacuum, and then held submerged and subjected to atmospheric pressure. The specimens (wafers) were soaked in the impregnating solutions for at least one half hour prior to their removal therefrom.

Although some wafers were immediately cured, the majority of wafers were stored at laboratory conditions (under a hood at ambient temperature) for seven days prior to cure. The specimens were cured by exposing same to 105° C. in a forced draft oven for 16 hours.

The data presented in Table I reflect initial monomer treatment level and monomer retention through the various above-described stages. These data demonstrate the superiority of the wood-polymer composites based upon dicyclopentenyl acrylate to those based upon tert-butylstyrene. In particular, the efficiency data under columns C/A and C/B demonstrate that the dicyclopentenyl acrylate polymer retention was superior in every instance to the corresponding tert-butylstyrene polymer retention. The wood-dicyclopentenyl acrylate composites were superior regardless of the presence or absence of a solvent or whether they were stored or cured immediately after treatment.

Table II presents moisture regain data from some of the same specimens described in Table I. Moisture regain is independent of monomer, solvent and/or level of retention. Individual cured wafers were exposed to various controlled relative humidity conditions and allowed to reach equilibrium. The relative humidity levels were controlled at approximately 66 percent, 75 percent and 90 percent by salt solutions. The data demonstrate that the cured dicyclopentenyl acrylate monomer is located in the gross wood voids and has not modified the capacity of the wood cell wall to absorb water.

TABLE I

Comparison of Dicyclopentenyl Acrylate and tert-Butylstyrene Retentions Through Various Stages of Treating and Cure

| Monomer | Solvent | Monomer in Treating System (%) | (A) At Treatment | (B) After 1 Week Storage | (C) After Cure | Efficiency*** C/A | C/B |
|---|---|---|---|---|---|---|---|
| DCPDA | ternary | 10 | 17.6 | 10.1 | 1.73 | 0.098 | 0.171 |
| | | 25 | 46.8 | 24.9 | 12.8 | 0.274 | 0.514 |
| | | 50 | 97.3 | 71.3 | 54.4 | 0.559 | 0.763 |
| | CH$_2$Cl$_2$ | 10 | 24.8 | 15.4 | 6.10 | 0.246 | 0.396 |
| | | 25 | 50.8 | 45.9 | 33.1 | 0.652 | 0.721 |
| | | 50 | 94.1 | 93.5 | 74.5 | 0.791 | 0.797 |
| | none | 100 | 181. | 151. | 114. | 0.630 | 0.755 |
| | | 100** | 210. | — | 143. | 0.681 | — |
| t-BS | ternary | 25 | 36.2 | 6.71 | 0 | 0 | 0 |
| | CH$_2$Cl$_2$ | 25 | 47.2 | 6.96 | 2.28 | 0.048 | 0.328 |
| | none | 100 | 172. | 12.4 | 4.74 | 0.027 | 0.382 |
| | | 100** | 181. | — | 87.4 | 0.483 | — |

*Average of 6 specimens based on calculated, oven-dry, untreated weight.
**Cured immediately after treatment.
***Column C data divided by Column A and B data respectively.

TABLE II

Equilibrium Moisture Content of Impregnated and Cured Wafers Exposed to Controlled Relative Humidity

| Monomer | Solvent | Monomer in Treating System (%) | Retention** of Monomer in Cured Specimen (%) | Moisture Regain (%)*** Relative Humidity (%) | | |
|---|---|---|---|---|---|---|
| | | | | 66 | 75 | 90 |
| DCPDA | ternary | 10 | 1.73 | 10.4 | 12.3 | 16.5 |
| | | 25 | 12.8 | 10.2 | 12.3 | 14.8 |
| | | 50 | 54.4 | 10.1 | 12.1 | 16.1 |
| | CH$_2$Cl$_2$ | 10 | 6.10 | 10.1 | 11.8 | 16.9 |
| | | 25 | 33.1 | 11.1 | 12.2 | 16.3 |
| | | 50 | 74.5 | 10.9 | 13.2 | 17.4 |
| | none | 100 | 114. | 9.85 | 12.2 | 16.5 |
| | | 100** | 143. | 9.26 | 11.4 | 16.1 |
| t-BS | ternary | 25 | 0 | 9.89 | 12.1 | 17.2 |
| | CH$_2$Cl$_2$ | 25 | 2.28 | 10.4 | 12.3 | 17.1 |
| | none | 100 | 4.74 | 10.3 | 12.3 | 16.6 |
| | | 100** | 87.4 | 9.83 | 11.8 | 16.5 |
| None | ternary | 0 | — | 9.83 | 12.1 | 17.2 |
| | CH$_2$Cl$_2$ | 0 | — | 10.8 | 12.0 | 17.2 |
| | deionized water | 0 | — | 10.6 | 12.5 | 16.5 |

*Average of 6 specimens, from Table I.
**Cured immediately after treatment.
***Data from a single specimen, based on calculated oven-dry, untreated weight.

What is claimed is:

1. A wood-polymer composite comprising a wood substrate impregnated with a dicyclopentenyl acrylate or methacrylate polymer, the polymer consisting of 100 weight percent of the component

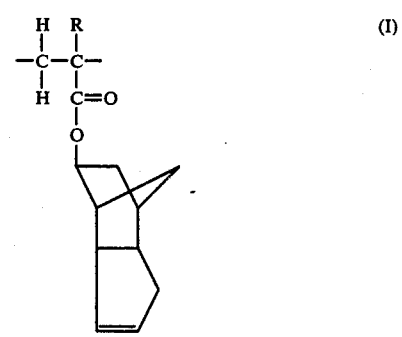

(I)

wherein R is hydrogen or methyl.

2. The wood-polymer composite of claim 1 wherein R is methyl.

3. The wood-polymer composite of claim 1 wherein R is hydrogen.

* * * * *

UNITED STATES PATENT AND TRADEMARK OFFICE
CERTIFICATE OF CORRECTION

PATENT NO. : 4,250,214
DATED : February 10, 1981
INVENTOR(S) : William E. Broxterman and Frederick L. Brown It is certified that error appears in the above-identified patent and that said Letters Patent are hereby corrected as shown below:

Column 1, line 28, "amenable to heat-catalyst" should read -- amenable to a heat-catalyst --.

Column 1, line 54, "-3-bromoacrylicacid-" should read -- -3-bromoacrylic acid- --.

Column 5, line 62, and Column 6, line 7, the fourth column heading of Table II, "Retention**" should read -- Retention* --.

Signed and Sealed this

Twenty-first Day of July 1981

[SEAL]

Attest:

Attesting Officer

GERALD J. MOSSINGHOFF
Commissioner of Patents and Trademarks